Sept. 21, 1948.　　　　D. M. GILMAN　　　　2,449,846
LOCK BOLT OR NUT
Filed June 15, 1946

Inventor
David M. Gilman
by Wright, Brown, Quinby & May
Attys

Patented Sept. 21, 1948

2,449,846

UNITED STATES PATENT OFFICE 2,449,846

LOCK BOLT OR NUT

David M. Gilman, Chelsea, Mass.

Application June 15, 1946, Serial No. 677,047

8 Claims. (Cl. 151—19)

This application is a continuation-in-part of my application for Lock bolt or nut, filed March 18, 1944, Serial No. 527,083, which was abandoned in favor of the present application.

This invention relates to lock nuts and bolts and has for an object to provide a locking element in the form of a split washer which is permanently retained by the bolt or nut which is locked.

A further object is to provide a locking construction which will not damage the threads of either the bolt or the nut so that each may be used over again as many times as desired.

Still another object is to provide for frictional holding of the parts where friction is exerted between the work and the washer as well as between the washer and the nut or bolt.

A further object is to provide simple construction and easy assembly of the parts.

Further objects and advantages will appear from a description of certain embodiments of the invention shown in the accompanying drawings, in which Figure 1 is an exploded perspective of a lock nut with a bolt and the lock washer supported on the bolt.

Figure 1:
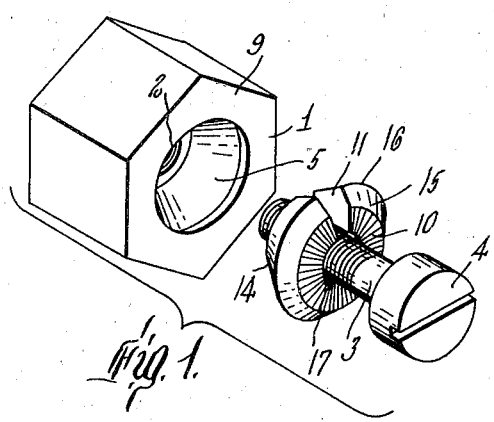

Referring first to Figures 1 to 5, at 1 is shown a nut having a threaded hole 2 for the reception of the shank 3 of a bolt 4. This bolt 4 may be of any suitable construction, it being not modified in any way in this embodiment of the invention. The nut 1 is provided with a recess 5 in one face, having its outer walls 6 and 7 tapered in opposite directions with the maximum diameter portion 8 somewhat inwardly from the opening face 9 of the nut. These walls 6 and 7 are substantially concentric to the threaded hole 2. Adapted to be held in the socket 5 is a split washer 10, shown in Figure 1 as placed over the shank 3 of the bolt. This washer is of resilient material and is split at one point, the faces 11 and 12 at each side of the split portion preferably being normally somewhat spaced apart when the washer is in unstressed condition. This washer is provided with a tapered face 14 substantially mating the tapered face 6 of the nut recess and it is also provided with a tapered face 15 facing in the opposite direction and substantially at the same inclination as the face 7 of the nut. The washer is so related to the recess in the nut when in unstressed condition that its maximum diameter portion 16 at the juncture between the faces 14 and 15 is of a diameter larger than the diameter at the outer edge of the recess 5, so that in order to assemble the washer within the socket, it is necessary to spring the washer somewhat closed in order to reduce its maximum diameter to an extent sufficient to allow it to be passed into the nut recess. After this has once been done and the washer is freed from restraint, it immediately springs outwardly to an extent sufficient to prevent accidental removal of the washer from the socket, the maximum diameter portion of the washer being then too great to pass through the mouth of the recess.

Figure 5:
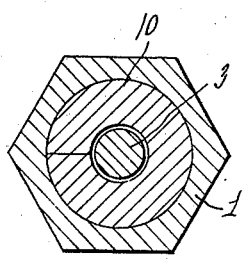
Figure 5 is a sectional view on line 5—5 of Figure 3.

Preferably the inner face 17 of the washer is somewhat larger than the maximum diameter of the bolt shank 3 in order that during use the washer will never be squeezed together to a point sufficient so that its inner face engages the threads of the bolt. Thus during use there is no possibility of the bolt threads being marred by engagement with the washer. The washer is so related to the socket of the nut that its outer face 20 projects beyond the nut face so that when the bolt and nut are applied to fasten parts together, as the parts 21 and 22 shown in Figures 2 and 3, the washer face engages the face of the work. This face may be roughened, as by scoring or knurling as shown in Figure 1, to increase the friction between the washer and the work. Thus when the bolt is tightened up onto the work as shown in Figure 3, the split washer is crowded back into the recess. The forcing inwardly by the washer by this tightening action acts through the mating inclined faces 6 and 14 of the recess and washer, respectively, to close the washer, its limit of motion being when the split end faces come together in mutual contact as shown in Figures 3 and 5, the action being under sufficiently heavy pressure to provide a frictional grip of the washer against the face of the work and between the washer and the nut, and also producing an axial thrust of the nut threads on the shank of the bolt which produces a large frictional drag against loosening of the bolt or the nut when once set up. It is not necessary either in setting up or removing the nut to effect any turning motion between the face of the washer and the work, substantially the entire sliding motion being between the nut and the washer, there being only the slight relative motion between the washer and the work caused by closing or opening of the washer at the split portion. As this is all restricted to an area smaller than the end face of the nut, no noticeable marring of the surface of the work when the nut is in position will be apparent. The work-engaging face of the washer may be roughened as by radial scoring to increase the frictional grip on the work as shown in Figure 1. However, the bolt and nut may be released by reverse relative turning and be immediately ready when removed from the work for replacement without the first use having done damage to either the bolt or the nut in any way, or the work surface having been scored by rotation of a nut or bolt head in contact therewith during the tightening or loosening of the nut or bolt. They may thus be used over and over as desired without loss of effectiveness or without marring the work.

Figure 6:
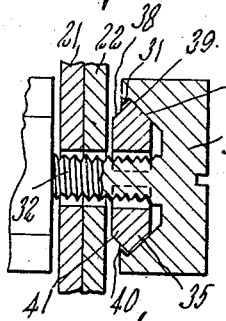
Figures 6 and 7 are views similar to Figures 2 and 3, respectively, but showing the locking washer as applied to the head of the bolt rather than to the nut.
Figure 7:
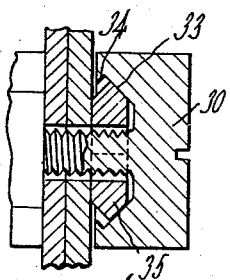

In Figures 6 and 7 a modification is shown in which the spring washer is applied to the head of the bolt rather than to the nut, an ordinary plain nut being used in connection therewith, or it may be threaded directly into the work. As shown in these figures, the bolt head 30 is recessed inwardly from its face 31 from which the threaded shank 32 extends, this recess having two reversely inclined walls 33 and 34. The split washer 35 adapted to be seated in this recess has similar reversely tapered faces 37 and 38 and its maximum diameter portion 39, when the washer is free from stress, is larger than the mouth 40 of the bolt head recess, so that the washer must be closed together somewhat in order to be inserted into the recess. After it is so inserted and free from stress, it expands and its maximum diameter is then too great to permit it to be removed accidentally from the recess. This washer extends outwardly from the recessed face as at 41 so it bears first against the work to which it is applied, and as the nut and bolt are tightened up, the washer is pressed rearwardly into the recess as shown in Figure 7, the washer being closed together as it is forced into the smaller diameter inner portion of the bolt head recess, the action being substantially the same as that described in connection with Figures 2 and 3 where the spring washer is contained with a recess in the nut rather than the bolt head. As in the case of the locking washer in the nut, preferably the inner diameter of this washer is sufficiently large so that at no time does it bear against the threads of the bolt shank, and as has been described in connection with the nut lock, preferably the split ends of the washer may be brought into contact before the washer is driven so far into the recess as to permit the bolt head to directly contact with the work.

Figure 8:
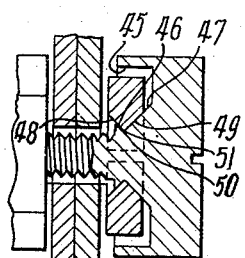
Figures 8 and 9 are views similar to Figures 6 and 7, respectively, but showing a modification.
Figure 9:
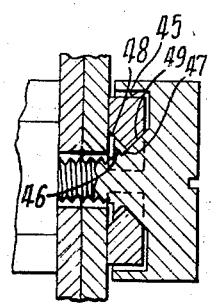

In Figures 8 and 9 a further modification is shown in which, instead of the outer face of the annular bolt head recess being reversely tapered, the inner face of this recess is so formed and the washer is correspondingly shaped. Thus as shown, the outer face of the recess is formed of uniform diameter as at 45, while the inner margin of the recess is provided by reversely inclined faces 46 and 47. The inner periphery of the split washer is formed with similarly inclined faces 48 and 49. In unstressed condition the minimum diameter portion 50 of the washer is smaller than the inner diameter of the nut head recess at the inner face 51 of the bolt head, so that the washer must be sprung open somewhat in order to be inserted into the bolt head recess, after which, when it is allowed to spring somewhat together to unstressed condition, it is held from accidental removal from the recess by its inner diameter portion being smaller than the inner diameter of the recess at its mouth. The washer projects outwardly beyond the inner face of the bolt head so that it contacts with the work when the bolt is screwed home, as shown in Figure 9, the pressure against the outer face of the washer causing it to be pressed backwardly within the recess of the bolt head and to be opened up as its inclined face 48 rides inwardly against the inclined face 46 of the bolt head.

Figure 10:
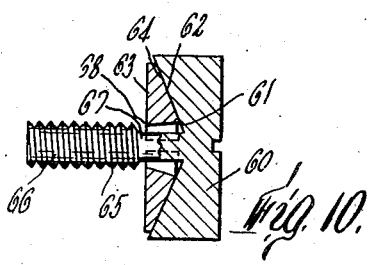
Figure 10 is a central cross sectional view through a bolt or screw having a lock washer associated therewith and showing a further modification.

In Figure 10 a further modification is shown in which the parts for preventing accidental separation of the split washer and the bolt or screw are on the split washer and the bolt or screw shank instead of the head. As shown the head 60 is provided with a recess 61 in its shank face, this recess having a tapered face 62. The split washer 63 is formed with a similarly inclined taper face 64 which bears against the face 62 of the head. The shank 65 of the bolt or screw is threaded at 66 and inwardly of the threaded portion it is of reduced diameter at 67, while the minimum inside diameter portion 68 of the split washer when in unconstrained condition is smaller than the threaded portion 66 of the shank and larger than the reduced diameter portion 67 of this shank. Thus the washer may be sprung open sufficiently to be passed over the threaded portion of the shank and then when it reaches the small diameter portion and is freed, it springs sufficiently far closed as to prevent accidental removal thereof. When the bolt or screw so formed is screwed home, the pressure of the work against the inner face of the washer, forcing it further into the recess, causes the reaction of the inclined faces 64 and 62 to tend to close the washer together and results in a heavy frictional locking effect between these inclined faces accompanied by an end thrust on the shank which serves to lock the bolt or screw against undesired loosening. Here, again, however, by turning the bolt or screw in the reverse direction, it may be freed from the work and be in wholly undamaged condition so that it may be re-used as desired.

Figure 2:
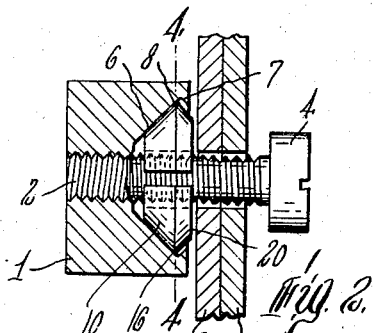
Figure 2 is a central cross section through a lock nut and a bolt, the shank of the bolt passing through members which are to be secured together but before the bolt and nut are tightened up to the work.
Figure 4:
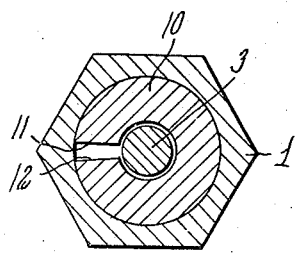
Figure 4 is a detail sectional view on line 4—4 of Figure 2.
Figure 3:
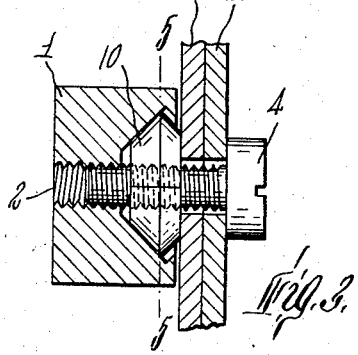
Figure 3 is a view similar to Figure 2, but showing the parts when the bolt and nut have been tightened to the work.
Figure 11:
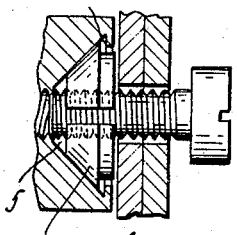
Figure 11 is a view similar to Figure 2, but showing a further modification.

In Figure 11 a modification of the construction of Figures 2 and 3 is shown in which the shoulder-forming wall 70 of the recess 5 is perpendicular to the axis of the nut instead of being tapered as is the face 7 shown in Figures 2 and 3, and the split washer 100 is similarly contoured. The action, however, is the same, the washer 100 being capable of sufficient deformation to pass the inner margin of the shoulder 70 for insertion into the recess or withdrawal therefrom.

In all the constructions shown, one of the parts, either the nut or the bolt, is provided with a recess to receive the split washer, the recess having an inclined face, and the part having an opposed shoulder which is of a diameter either internally or externally to permit the washer, but only when deformed from unstressed condition, to be moved therepast into or out of the recess, the washer being provided with a tapered face substantially mating the taper of the recess and being of a length to project out of the recess sufficiently to be engaged with the face of the work to which the bolt and nut is applied.

From the foregoing description of certain embodiments of this invention, it should be evident to those skilled in the art that various changes and modifications might be made without departing from the spirit or scope of this invention.

I claim:

1. In combination, a threaded member adapted to cooperate with a mating threaded member for fastening purposes, one of said members having a recess in one face having oppositely tapered wall portions concentric with the axis of the threads and merging in a maximum diameter portion, and a split spring washer seated in said recess and having tapered faces reversely positioned with respect to the tapered faces of said recess, the maximum diameter portion of said washer when in unstressed condition and with its split ends spaced apart being greater than the face opening of said recess, whereby said washer must be pressed toward split end closed condition to be inserted into said recess and after being so inserted and freed from pressure is retained therein, said washer projecting outwardly beyond said member to be engaged by work secured by said member and said cooperating threaded member and forced inwardly and with its split ends forced toward each other as said members are tightened against the work.

2. In combination, a threaded member adapted to cooperate with a mating threaded member for fastening purposes, said member having a recess in one face having oppositely tapered wall portions concentric with the axis of the threads and merging in a maximum diameter portion, and a split spring washer seated in said recess and having tapered faces reversely positioned with respect to the tapered faces of said recess, the maximum diameter portion of said washer when in unstressed condition and with its split ends spaced apart being greater than the face opening of said recess, whereby said washer must be pressed toward split end closed condition to be inserted into said recess and after being so inserted and freed from pressure is retained therein, said washer projecting outwardly beyond said member to be engaged by work secured by said member and said cooperating threaded member and forced inwardly and with its split ends forced toward each other as said members are tightened against the work, the inner bore of said washer being of larger diameter than the threaded portion of said member even when said split ends are brought into mutual contact.

3. In combination, a nut threaded for the reception of a bolt, said nut having a recess in one end face having oppositely tapered wall portions concentric with the axis of the threads and merging in a maximum diameter portion, and a split spring washer seated in said recess and having tapered faces reversely positioned with respect to the tapered faces of said recess, the maximum diameter portion of said washer in unstressed condition and with its split ends spaced apart being greater than the face opening of said recess, whereby said washer must be pressed toward split closed condition to be inserted into said recess and after being so inserted is retained therein, said washer projecting outwardly beyond said nut end to be engaged by work secured by said nut and bolt and forced inwardly and with its split ends toward each other as said nut is tightened on said bolt.

4. In combination, a bolt having a head and a threaded shank, said head having an annular recess in its shank face, the outer margin of said recess having oppositely tapered wall portions substantially concentric to the axis of said shank and merging in a maximum diameter portion, and a split spring washer seated in said recess and having tapered faces reversely positioned with respect to the tapered faces of said recess, the maximum diameter portion of said washer in un-stressed condition and with its split ends spaced apart being greater than the face opening of said recess whereby said washer must be pressed toward split closed condition to be inserted into said recess and after so inserted and freed is retained therein, said washer projecting outwardly beyond said head face to be engaged by work secured by said bolt and forced inwardly and with its split ends toward each other as said bolt is tightened against the work.

5. In combination, a bolt having a head and a threaded shank, said head having an annular recess in its shank face, one side wall of said recess being tapered in opposite directions, a split spring washer seated in said recess and having its wall facing said tapered wall matingly tapered, the extreme free diameter of said washer tapered faces being sufficiently different and in the proper sense from that of the mouth of said recess at said tapered faces that said washer must be sprung to be inserted into said recess and is thereafter when freed retained therein against accidental removal, said washer projecting out of said recess thereby to engage the face of work through which said bolt may extend in service.

6. In combination, a threaded fastener having a head and a threaded shank, said head having an annular recess in its shank face, said recess having a tapered wall portion concentric to the axis of said shank, and a split spring washer seated in said recess and having a tapered face reversely positioned with respect to the tapered face of said recess, said washer projecting outwardly of said head to be engaged by work secured by said fastener and with its split ends forced toward each other as said fastener is tightened to the work, said fastener and washer having parts cooperating when said washer is in unstressed condition to obstruct removal of said washer from said fastener, said washer having a bore through which said shank extends of sufficient diameter for said washer to be free from said shank when said split ends are in contact with each other.

7. In combination with a threaded member, a mating threaded member cooperating therewith for fastening purposes, one of said members having a recess in one face having a tapered wall portion and an opposed annular shoulder, and a split washer seated in said recess and projecting therefrom, said washer having a face tapered to substantially mate the tapered face of said recess, said shoulder being of a diameter to permit removal from and insertion of said washer into said recess therepast only on deformation of said washer from normal condition, said washer having a bore through which one of said threaded members extends of sufficient diameter to be free from said one threaded member when the split portion of said washer is closed.

8. In combination with a threaded member, a mating threaded member cooperating therewith for fastening purposes, one of said members having a recess in one face having a tapered wall portion and a shoulder portion, a split washer having a tapered face substantially mating the tapered face of said recess, and positioned between said tapered face of said recess and said shoulder portion, said shoulder portion being of such size relative to said washer as to prevent removal of said washer past said shoulder portion when said washer is in unstressed condition, but permitting such removal when said washer is sprung sufficiently out of such condition, said washer having a bore through which one of said threaded members extends of sufficient diameter to be free from said one threaded member when the split portion of said washer is closed.

DAVID M. GILMAN.

REFERENCES CITED

The following references are of record in the file of this patent:

FOREIGN PATENTS

| Number | Country | Date |
|---|---|---|
| 81,356 | Switzerland | June 6, 1919 |